United States Patent Office 3,465,082
Patented Sept. 2, 1969

3,465,082
PROCESS OF CONTROLLING FUNGI WITH
3,4-DIHALOCINNAMIDES
Gilbert A. Youngdale, Kalamazoo, Mich., assignor to The
Upjohn Company, Kalamazoo, Mich., a corporation of
Delaware
No Drawing. Original application Sept. 27, 1966, Ser. No.
582,265. Divided and this application Sept. 25, 1968,
Ser. No. 762,656
Int. Cl. A61k 27/00; A01n 9/20; C07c 103/30
U.S. Cl. 424—324                             3 Claims

ABSTRACT OF THE DISCLOSURE

The instant invention pertains to a process of controlling fungi with 3,4-dihalocinnamides.

---

This application is a division of my copending application Ser. No. 582,265, filed Sept. 27, 1966.

This invention pertains to novel chemical compounds, and is more particularly directed to new 3,4-dihalocinnamamides of the formula:

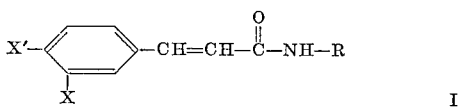

wherein X and X' are halogen and R is hydrogen or methyl.

The 3,4-dihalocinnamides of this invention (compounds of Formula 1) are fungicides and can be used for preventing fungal growth. More particularly, the 3,4-dihalocinnamides of this invention can be used to prevent fungal growth on organic matter such as wood, cellulosic fibers, seeds, fruits, and vegetables; living plants; soil; and on animals such as fish, reptiles, birds cattle, horses, dogs, and other animals. The invention includes, therefore, the method of controlling fungi in general as well as fungi pathogenic to seeds, plants, and animals. The invention also includes fungicidal formulations comprising the 3,4-dihalocinnamamides of this invention as the essential active ingredient.

The 3,4-dihalocinnamamides of this invention (compounds of Formula I) are obtained by reacting a 3,4-dihalocinnamoyl halide with ammonia or methylamine (a preferred method in accordance with this invention). The compounds can also be prepared by a substitution reaction involving esters (e.g., methyl or ethyl) of 3,4-dihalocinnamic acid and ammonia or methylamine. Another method of preparing 3,4-dihalocinnamamide is by heating the ammonium salt of 3,4-dihalocinnamic acid in order to effect internal dehydration.

The preferred method of preparing the 3,4-dihalocinnamamides is effected by reacting 3,4-dihalocinnamoyl chloride with ammonia or methylamine in the presence of an inert reaction medium at about 25° C. Suitable inert reaction media include benzene (preferred), toluene, xylene, cyclohexane, methylene chloride, chloroform, diethyl ether, carbon tetrachloride, tetrahydrofuran, and the like. Through mixing promotes completion of the reaction; and when the reaction is completed, the 3,4-dihalocinnamamide is recovered by conventional methods.

In many instances the cinnamamide product crystallizes out of the reaction mixture; the crystals can be recovered by filtration, washed with water, dried, and recrystallized from a suitable solvent. Suitable recrystallizing solvents include acetone, aqueous methanol, aqueous tetrahydrofuran, benzene, and mixtures such as methylene chloride-cyclohexane.

At least two moles of ammonia or methylamine should be used for each mole of 3,4-dihalocinnamoyl chloride, but preferably, an excess of ammonia or methylamine is used. Illustratively, about 2, about 4, or even more moles of ammonia or methylamine can be used. Advantageously, temperatures lower than 25° C., e.g., about —10° C. to about 10° C. can be used in order to minimize loss of the ammonia or methylamine reactant. After mixing, the reaction mixture can be allowed to warm to about 25° C. for completion of the reaction. Depending upon the reaction medium used, the cinnamamide product can be recovered by conventional techniques such as evaporation, solvent extraction, fractional distillation, and chromatography.

The starting 3,4-dihalocinnamoyl halides are prepared by reacting a 3,4-dihalocinnamic acid with a thionyl halide (preferably thionyl chloride to obtain 3,4-dihalocinnamoyl chloride). Any of the desired 3,4-dihalocinnamic acids can be readily prepared by reacting an appropriate 3,4-dihalobenzaldehyde with malonic acid according to the Doebner reaction described by C. Walling and K. B. Wolfstirn, J.A.C.S. 69, pp. 852–854 (1947).

The novel 3,4 - dihalocinnamides of this invention (compounds according to Formula 1) are formulated as fungicides with solid and liquid carriers with or without adjuvants. The compounds can be used in pure form, but generally the interest of economy is best served by the formulations of the invention. The pure active compounds or the formulations can be applied to fungi, objects, or situs for preventing fungal growth. The fungicidal formulations of this invention include dispersions in powder and granular carriers, i.e., dusts and granules; dispersions in liquid carriers, i.e., true solutions, suspensions and emulsifiable concentrates; smokes and aerosols; emulsions, i.e., creams and ointments; and capsules and tablets.

The 3,4-dihalocinnamides of this invention are solids, and they can be readily formulated as dusts by grinding a mixture of the compound and a pulverulent carrier in the presence of each other. Grinding is conveniently accomplished in a ball mill, a hammer mill, or by air-blast micronization. A suitable ultimate particle size is less than 60 microns. Preferably, 95% of the particles are less than 50 microns, and about 75% are 5 to 20 microns. Dusts of that degree of comminution are conveniently free-flowing and can be applied to animals, inanimate matter, fruit trees, crop plants, and soil so as to effect thorough distribution and coverage. Dusts are particularly adapted for effectively controlling fungi over wide areas when applied by airplane. They are also indicated for application to the undersides of plant foliage and to the skin of hairy animals.

Representative suitable pulverulent carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica, and organic flours such as wood, walnut shell, soybean, cottonseed, and tobacco flours, and free-flowing, hydrophobic starches.

Dusts can also be prepared by dissolving the 3,4-dihalocinnamamide in a volatile solvent such as methylene chloride, mixing the solution with a pulverulent carrier and evaporating the solvent.

The proportions of pulverulent carrier and 3,4-dihalocinnamamide can vary over a wide range depending upon the fungi to be controlled and the conditions of treatment. In general, dust formulations can contain up to about 90% (on a weight basis) of the active ingredient. Dusts having as little as 0.001% of the active ingredient can be used, but a generally preferred proportion is from about 0.50% to about 20% of active ingredient.

The dispersible powder formulations of this invention are prepared by incorporating a surfactant in a dust composition prepared as described above. When about 0.1% to about 12% of a surfactant is incorporated in a dust, the dispersible powder thus obtained is particularly adapted for further admixture with water for spraying on inanimate matter and products, fruit trees, field crops, soil, and livestock. The dispersible powders can be admixed with water to obtain any desired concentration of active ingredient, and the mixture can be applied in amounts sufficient to obtain predetermined rates of application and uniform distribution. With this flexibility in mind, the dispersible powders of the invention can conveniently comprise preferably about 10% to about 80% of active ingredient.

Representative surfactants useful for preparing dispersible powder formulations of this invention include alkyl sulfates and sulfonates, alkyl aryl sulfonates, sulfosuccinate esters, polyoxyethylene sulfates, polyoxyethylenesorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H–77), blends of polyoxyethylene ethers and oil-soluble sulfonates (Emcol H–400), blends of alkyl aryl sulfonates and alkylphenoxy polyethoxy ethanols (Tritons X–151, X–161, and X–171), e.g., about equal parts of sodium kerylbenzene sulfonate and isooctylphenoxy polyethoxy ethanol containing about 12 ethoxy groups and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1% or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X–100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified).

| | Percent |
|---|---|
| Active ingredient | 25 |
| Isooctylphenoxy polyethoxy ethanol | 1 |
| Polymerized sodium salt of substituted benzoid long-chain sulfonic acid | 2 |
| Georgia clay | 72 |

This formulation, when dispersed in water at the rate of 10 lbs. per 100 gals., gives a spray formulation containing about 0.3% (3000 p.p.m.) active ingredient which can be applied to soil, plant growth media, or turf at the rate of 40 gals. per acre to give a total application of active ingredient of 1 lb. per acre.

If desired, dispersants such as methyl cellulose, polyvinyl alcohol, sodium ligninsulfonates, and the like can be included in the dispersible powder formulations of this invention. Adhesive or sticking agents such as vegetable oils, naturally occurring gums, casein, and others can also be included. Corrosion inhibitors such as epichlorohydrin and anti-foaming agents such as stearic acid can also be included.

The granular formulations according to this invention are prepared by permeating a granular carrier with a solution of a 3,4-dihalocinnamamide and then drying the granules. Suitable granular carriers include vermiculite, pyrophyllite, and attapulgite. Suitable solvents include acetone, methyl ethyl ketone, and methylene chloride. A solution of a 3,4-dihalocinnamamide is sprayed on a granular carrier while the carrier is being mixed and tumbled. The granules are then dried. The granules can range in size from about 10 to about 60 mesh, preferably about 30 to about 60 mesh.

The compounds of this invention can be applied to fungi, objects, or situs in aqueous sprays without a solid carrier. Since, however, the compounds themselves are relatively insoluble in water they are preferably dissolved in a suitable inert organic solvent carrier. Advantageously, the solvent carrier is immiscible with water so that an emulsion of the solvent carrier in water can be prepared. If, for example, a water-miscible solvent carrier such as ethanol is used the solvent carrier will dissolve in the water and any excess 3,4-dihalocinnamamide will be thrown out of solution. In an oil-in-water emulsion, the solvent phase is dispersed in the water phase and the dispersed phase contains the active ingredient. In this way, uniform distribution of a water insoluble active ingredient is achieved in an aqueous spray. A solvent carrier in which 3,4-dihalocinnamamides are highly soluble is desirable so that relatively high concentrations of active ingredient can be obtained. Sometimes, one or more solvent carriers with or without a cosolvent can be used in order to obtain concentrated solutions of the active ingredient, the main consideration being to employ a water-immiscible solvent for the active ingredient that will hold the compound in solution over the range of concentrations useful for preventing fungal growth.

The emulsifiable concentrates of the invention are prepared, therefore, by dissolving the active ingredient and a surfactant in a substantially water-immiscible solvent carrier (i.e., a solvent carrier which is soluble in water to the extent of less than 2.5% by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol, and the like can be included with the solvent carrier in order to enhance the solubility of the active ingredient. Aqueous emulsions are then prepared by mixing with water to give any desired concentration of active ingredient. The surfactants which can be employed in the aqueous emulsions of the invention are those types noted above. Mixtures of surfactants can be employed, if desired.

Advantageously, the concentration of active ingredient in the emulsifiable concentrates can range from about 5% to about 50% by weight, preferably from about 10% to about 40%. A concentrate comprising 20% (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20% concentrate mixed with 40 gals. of water provides about 1200 p.p.m. (parts per million) of active ingredient. In the same manner, more concentrated solutions of active ingredient can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium ligninsulfonate, and the like.

The rates of application to fungi, objects, or situs will depend upon the species of fungi to be controlled, the presence or absence of desirable living organisms, temperature conditions of treatment, and the method and efficiency of application. In general, fungicidal activity is obtained when the compounds are applied at concentrations of about 10 to about 6000 p.p.m., preferably at concentrations of about 100 to about 1200 p.p.m.

The compositions containing 3,4-dihalocinnamides according to the invention, can be applied to fungi, objects or situs by conventional methods. For example, an area of soil or plants can be treated by spraying wettable powder suspensions, emulsions, or solutions from boom-type power sprayers or from hand-operated knapsack sprayers. Dusts can be applied by power dusters, or by hand-operated dusters. Creams and ointment formulations can be applied to skin or objects for prolonged protection from fungi.

The following examples are illustrative of the process and products of the present invention, but are not to be construed as limiting.

EXAMPLE 1

Preparation of 3,4-dichlorocinnamamide

A mixture consisting of 30 gm. (0.138 mole) 3,4-dichlorocinnamic acid, 30 gm. (0.252 mole) thionyl chloride, and 45 ml. dry benzene was heated at the reflux temperature until (about one and one-half hours) a homogeneous solution was obtained. The benzene and excess thionyl chloride were removed by evaporation under reduced pressure and at 70° C. The oily residue thus obtained was cooled to about 25° C., and a solid formed. The solid was dissolved in 200 ml. dry benzene, and the solution was mixed with an additional 100 ml. dry benzene that had been saturated with ammonia and cooled in an ice bath for 10 min. The mixture was stirred for 1 hr. at about 25° C. and 100 ml. concentrated aqueous ammonium hydroxide was added. After stirring for 1 hr. the alkaline solution was held at about 25° C. overnight. The solid that separated was collected on a filter and washed with water. The filter cake was dissolved in aqueous methanol and cooled. There was thus obtained 22 gm. (74% yield) of 3,4-dichlorocinnamamide as colorless needles melting at 140° to 141.5° C. After a second recrystallization from aqueous methanol, the melting point was unchanged.

Analysis.—Calcd. for $C_9H_7Cl_2NO$: C, 50.01; H, 3.27; Cl, 32.81; N, 6.48. Found: C, 49.94; H, 2.93; Cl, 32.62; N, 6.31.

The compound 3,4-dichlorocinnamamide possesses broad antifungal activity and is not phytotoxic except for moderate activity against cucumber. Hence, it can be used against fungi that cause disease and damage to plants.

In an antifungal test, the compound inhibited the specified fungi at the specified concentration.

Mcg./ml. to inhibit test organisms

| | |
|---|---|
| Nocardia asteroides | 100 |
| Blastomyces dermatitidis | 10 |
| Coccidioides immitis | 100 |
| Geotrichum sp. | 100 |
| Hormodendrum compactum | 100 |
| Cryptococcus neoformans | 100 |
| Histoplasma capsulatum | 100 |
| Sporotrichum schenckii | 100 |
| Monosporium apiospermum | 100P |
| Candida albicans Ab | 1000P |
| Trichophyton interdigitale | 100 |
| Trichophyton asteroides | 100 |
| Trichophyton mentagrophytes | 100 |

P=Partial Inhibition

In another antifungal test, the percentage inhibitions of the specified fungi were estimated.

FUNGITOXIC SPECTRUM.—PERCENTAGE INHIBITION OF FUNGAL GROWTH

| Test Fungus | 100 p.p.m. | 500 p.p.m. |
|---|---|---|
| Alternaria solani | 25 | 85 |
| Botrytis cinerea | 76 | 100 |
| Candida sp | 100 | 100 |
| Cephalosporium sp | 75 | 100 |
| Cladosporium sp | 93 | 100 |
| Fusarium oxysporum f. lycopersici | 48 | 90 |
| Fusarium oxysporum f. cubense | 72 | 100 |
| Fusarium roseum | 60 | 100 |
| Glomerella cingulate | 74 | 100 |
| Helminthosporium sp | 65 | 94 |
| Monilinia fructicola | 100 | 100 |
| Penicillium patulum | 35 | |
| Phytophthora cinnamoni | 100 | 100 |
| Pythium ultimum | 84 | 100 |
| Rhizoctonia silani | 100 | 100 |
| Sclerotinia sclerotiorum | 96 | 100 |
| Stemphylium sarcinaeforme | 68 | 95 |
| Thielaviopsis sp | 91 | 97 |
| Trichoderma sp | 21 | 100 |
| Verticillium albo-atrum | 66 | 89 |

EXAMPLE 2

Preparation of 3,4-dichloro-N-methylcinnamamide

A mixture consisting of 9.0 gm. (0.041 mole) 3,4-dichlorocinnamic acid and 9.0 gm. (0.076 mole) thionyl chloride was heated at the reflux temperature for one and one-half hours. After evaporating the excess thionyl chloride, the residue was dissolved in 60 ml. benzene and 20 gm. of a 25% aqueous solution of methylamine was added. The mixture was stirred for 1 hr. at about 25° C. while a precipitate formed. The precipitate was collected on a filter and dissolved in methylene chloride. The solution was washed three times with water and dried, and the methylene chloride was evaporated. The solid thus obtained was recrystallized from acetone and dried to give 8.0 gm. 3,4 - dichloro-N-methylcinnamamide melting at 158° to 159° C.

Analysis.—Calcd. for $C_{10}H_9Cl_2NO$: C, 52.2; H, 3.94; Cl, 30.82; N, 6.09. Found: C, 52.13; H, 4.16; Cl, 31.19; N, 5.95.

The compound 3,4-dichloro - N - methylcinnamamide possesses antifungal activity like 3,4 - dichlorocinnamamide. The compound also acts as a preemergence herbicide against crabgrass.

In antifungal tests, the compound inhibited Fusarium oxysporum, inhibited Monilinia fructicola—70%, and inhibited Rhizoctonia solani—50%.

EXAMPLE 3

Following the procedure of Example 1, but substituting 3,4-dibromo-, 3,4-diiodo-, 3,4-difluoro-, 3-chloro-4-bromo-, and 3-chloro-4-iodocinnamic acid for 3,4-dichlorocinnamic acid, there were prepared: 3,4-dibromocinnamamide, 3,4 - diiodocinnamamide, 3,4-difluorocinnamamide, 3-chloro-4-bromocinnamamide, and 3-chloro-4-iodocinnamamide, respectively.

EXAMPLE 4

Following the procedure of Example 2, but substituting 3,4-dibromo-, 3,4-diiodo-, 3,4-difluoro-, 3-chloro-4-bromo-, and 3-chloro - 4-iodocinnamic acid for 3,4-dichlorocinnamic acid, there were prepared: 3,4-dibromo-N-methylcinnamamide, 3,4 - diiodo - N - methylcinnamamide, 3,4-difluoro - N - methylcinnamamide, 3-chloro-4-bromo-N-methylcinnamamide, and 3-chloro-4-iodo-N-methylcinnamamide, respectively.

EXAMPLE 5

A dispersible powder concentrate having the following percentage composition:

| | Percent |
|---|---|
| 3,4 - dichlorocinnamamide | 45.8 |
| Polymerized sodium salt of substituted benzoid long-chain sulfonic acid (Daxad 27) | 9.2 |
| Kaolinite | 45.0 | was prepared by mixing 250 gm. 3,4-dichlorocinnamide, 50 gm. of a polymerized sodium salt of substituted benzoid long-chain sulfonic acid (Daxad 27), and 245 gm. of kaolinite. The mixture was milled to a particle size averaging 5 to 30 microns. It was suspended in 10 gals. of water, giving an aqueous spray containing about 6500 parts per million of active ingredient.

EXAMPLE 6

A fine granular formulation having the following percentage composition:

| | Percent |
|---|---|
| 3,4-dichloro-N-methylcinnamamide | 3.7 |
| Vermiculite (30/60 mesh) | 96.3 | was prepared by spraying a solution of 220 gm. of 3,4-dichloro-N-methylcinnamamide in 1000 ml. of methylene chloride on 5780 gm. of vermiculite (30 to 60 mesh) while the vermiculite was being tumbled and stirred so as to assure even distribution. The methylene chloride was then evaporated, leaving the 3,4-dichloro-N-methylcinnamamide adsorbed on the vermiculite, and the vermiculite was pulverized.

EXAMPLE 7

An emulsifiable concentrate having the following percentage composition;

| | Percent |
|---|---|
| 3,4-dichlorocinnamamide | 15.0 |
| Technical alkyl naphthalene boiling at 238° to 293° C. (Velsicol AR50) | 19.7 |
| Xylene | 17.4 |
| Isopropanol | 17.4 |
| Ethylene dichloride | 25.4 |
| Blend of alkyl aryl sulfonates and alkylphenoxy polyethoxy ethanols (Triton X–151) | 5.1 | was prepared by mixing 15.0 lbs. of 3,4-dichlorocinnamamide, 19.7 lbs. of Velsicol AR50, 17.4 lbs. of xylene, 17.4 lbs. of isopropanol, 25.4 lbs. of ethylene dichloride, and 5.1 lbs. of Triton X-151.

6.67 lbs. of the concentrate mixed with 10 gals. of water gave a spray emulsion containing 11,000 p.p.m. of 3,4-dichlorocinnamamide.

EXAMPLE 8

An emulsifiable concentrate having the following percentage composition:

| | Percent |
|---|---|
| 3,4-dichloro-N-methylcinnamamide | 40.0 |
| Technical alkyl naphthalene boiling at 238° to 293° C. (Velsicol AR50) | 13.7 |
| Xylene | 12.3 |
| Isopropanol | 11.3 |
| Ethylene dichloride | 17.7 |
| Blend of alkyl aryl sulfonates and alkylphenoxy polyethoxy ethanols (Triton X–151) | 5.0 | was prepared by mixing 40.0 lbs. of 3,4-dichloro-N-methylcinnamamide, 13.7 lbs. of Velsicol AR50, 12.3 lbs. of xylene, 11.3 lbs. of isopropanol, 17.7 lbs. of ethylene dichloride, and 5.0 lbs. of Triton X–151.

1.67 lbs. of the concentrate mixed with 10 gals. of water gave a spray emulsion containing 8,000 p.p.m. of 3,4-dichloro-N-methylcinnamamide.

EXAMPLE 9

A wettable powder concentrated having the following percentage composition:

| | Percent |
|---|---|
| 3,4-dichloro-N-methylcinamamide | 50 |
| Kaolinite clay (finely divided) | 46 |
| Sodium salt of condensed mononaphthalene sulfonic acid (Lomar D) | 4 | was prepared by mixing 50 g. of 3,4-dichloro-N-methylcinnamamide, 46 gm. of the kaolinite clay, and 4 gm. of Lomar D. The mixture was milled to an average particle size of 5 to 30 microns.

EXAMPLE 10

A granular formulation having the following percentage composition:

| | Percent |
|---|---|
| 3,4-dichlorocinnamamide | 1 |
| Pyrophyllite (30/60 mesh) | 99 | was prepared by dissolving 1.0 lb. of 3,4-dichlorocinnamamide in 10.0 l. of ethylene dichloride and spraying the solution on 99.0 lbs. of pyrophyllite. The granules were dried and then packaged for use.

I claim:
1. Process for controlling fungi which comprises applying to fungi a fungicidal amount of a compound of the formula:

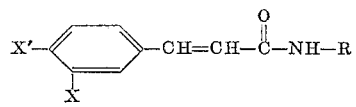

wherein X and X' are halogen and R is hydrogen or methyl.

2. The process according to claim 1 wherein a fungicidal amount of 3,4-dichlorocinnamamide is applied.

3. The process according to claim 1 wherein a fungicidal amount of 3,4-dichloro-N-methylcinnamamide is applied.

References Cited

UNITED STATES PATENTS 3,378,579  4/1968  Allen et al. ____ 424—324 XR

ALBERT T. MEYERS, Primary Examiner

D. R. MAHANAND, Assistant Examiner

U.S. Cl. X.R.

71—118; 424—23, 357, 168; 260—558, 544

UNITED STATES PATENT OFFICE
CERTIFICATE OF CORRECTION

Patent No. 3,465,082      Dated September 2, 1969

Inventor(s) Gilbert A. Youngdale

It is certified that error appears in the above-identified patent and that said Letters Patent are hereby corrected as shown below:

Column 2, line 22, correct "3,4-dihalocinnamides" to --3,4-dihalocinnamamides--; Column 6, line 14, add the number --83-- under "500 p.p.m."; Column 8, line correct "concentrated" to --concentrate--; line 11, correct "methylcinamamide" to --methylcinnamamide--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents